US012247185B2

(12) United States Patent
Olson et al.

(10) Patent No.: US 12,247,185 B2
(45) Date of Patent: Mar. 11, 2025

(54) MULTIPURPOSE ALKALINE COMPOSITIONS AND METHODS OF USE

(71) Applicant: ECOLAB USA INC., Saint Paul, MN (US)

(72) Inventors: Erik C. Olson, Saint Paul, MN (US); Hilina Emiru, Saint Paul, MN (US); Derrick Anderson, Saint Paul, MN (US); Kelly Anne Rightmire, Saint Paul, MN (US); Timothy Meier, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 193 days.

(21) Appl. No.: 17/249,784

(22) Filed: Mar. 12, 2021

(65) Prior Publication Data

US 2022/0162526 A1 May 26, 2022

Related U.S. Application Data

(60) Provisional application No. 63/198,957, filed on Nov. 25, 2020.

(51) Int. Cl.
*C11D 1/02* (2006.01)
*C11D 1/22* (2006.01)
(Continued)

(52) U.S. Cl.
CPC .................. *C11D 3/33* (2013.01); *C11D 1/22* (2013.01); *C11D 1/66* (2013.01); *C11D 1/75* (2013.01);
(Continued)

(58) Field of Classification Search
CPC .... C11D 1/66; C11D 1/22; C11D 1/75; C11D 3/30; C11D 3/33
(Continued)

(56) References Cited

U.S. PATENT DOCUMENTS 4,372,788 A 2/1983 Lancz
4,414,128 A 11/1983 Goffinet
(Continued)

FOREIGN PATENT DOCUMENTS

CA 3126090 A1 9/2020
EP 0379093 A1 7/1990
(Continued)

OTHER PUBLICATIONS

International Searching Authority in connection with PCT/US2021/060268 filed Nov. 22, 2021, "The International Search Report and the Written Opinion of the International Searching Authority, or the Declaration", 12 pages, mailed Mar. 9, 2022.
(Continued)

*Primary Examiner* — Gregory R Delcotto
(74) *Attorney, Agent, or Firm* — McKee, Voorhees & Sease, PLC

(57) ABSTRACT

Liquid multipurpose alkaline compositions for use as pre-sprays to beneficially remove polymerized soils, de-stain, remove hard water deposits and/or otherwise assist in general cleaning of difficult soils are provided. The multipurpose alkaline compositions include at least one non-hydroxide alkaline source, at least one surfactant, a chelant and a solvent system. The multipurpose alkaline compositions can be PPE free compositions. Methods of using the multipurpose alkaline compositions as pre-treatments, soaks and/or application in machine and manual warewash are also provided. Methods for using the multipurpose alkaline compositions for removing tea stains, coffee stains, hard water scale/deposits, polymerized oils, carbonized soils, fats, oils, and cosmetics are further provided.

18 Claims, 10 Drawing Sheets
(5 of 10 Drawing Sheet(s) Filed in Color)

(51) Int. Cl.

| | |
|---|---|
| ***C11D 1/66*** | (2006.01) |
| ***C11D 1/75*** | (2006.01) |
| ***C11D 3/30*** | (2006.01) |
| ***C11D 3/33*** | (2006.01) |
| ***C11D 3/43*** | (2006.01) |
| ***C11D 3/44*** | (2006.01) |

(52) U.S. Cl.
CPC .................. *C11D 3/30* (2013.01); *C11D 3/43* (2013.01); *C11D 2111/16* (2024.01); *C11D 2111/18* (2024.01)

(58) Field of Classification Search
USPC .......................... 510/235, 238, 499, 505, 506
See application file for complete search history.

(56) References Cited

U.S. PATENT DOCUMENTS

| | | | | |
|---|---|---|---|---|
| 5,076,955 | A | 12/1991 | Ussat et al. | |
| 5,080,822 | A | 1/1992 | VanEenam | |
| 5,080,831 | A | 1/1992 | VanEenam | |
| 5,158,710 | A | 10/1992 | VanEenam | |
| 5,254,290 | A | 10/1993 | Blandiaux et al. | |
| 5,362,422 | A * | 11/1994 | Masters | C11D 1/94 510/432 |
| 5,531,933 | A | 7/1996 | Masters et al. | |
| 5,540,865 | A | 7/1996 | Michael | |
| 5,585,341 | A | 12/1996 | Van Eenam | |
| 5,612,308 | A | 3/1997 | Woo et al. | |
| 5,783,538 | A | 7/1998 | Totoki | |
| 5,786,319 | A | 7/1998 | Pedersen et al. | |
| 5,849,682 | A | 12/1998 | Van Eenam | |
| 5,922,665 | A | 7/1999 | Liu | |
| 5,977,042 | A | 11/1999 | Hernandez et al. | |
| 6,184,188 | B1 | 2/2001 | Severns et al. | |
| 6,277,805 | B1 * | 8/2001 | Kupneski | C11D 3/48 510/488 |
| 6,423,677 | B1 | 7/2002 | Van Eenam | |
| 6,506,717 | B1 | 1/2003 | Kott et al. | |
| 6,537,957 | B1 | 3/2003 | Cardola et al. | |
| 6,544,942 | B1 | 4/2003 | Smith et al. | |
| 6,699,825 | B2 | 3/2004 | Rees et al. | |
| 6,723,692 | B2 | 4/2004 | Foley et al. | |
| 6,784,148 | B2 | 8/2004 | Tadrowski et al. | |
| 6,916,773 | B2 | 7/2005 | Griese et al. | |
| 6,929,702 | B1 | 8/2005 | Motsenbocker | |
| 7,053,037 | B2 | 5/2006 | Smith et al. | |
| 8,329,630 | B2 | 12/2012 | Finison et al. | |
| 8,383,569 | B2 | 2/2013 | Schwerter et al. | |
| 8,420,587 | B2 | 4/2013 | Cermenati et al. | |
| 8,901,059 | B2 | 12/2014 | Evers et al. | |
| 8,969,282 | B2 | 3/2015 | Heisig et al. | |
| 9,023,782 | B2 | 5/2015 | Peitersen et al. | |
| 9,103,038 | B2 | 8/2015 | Mohs et al. | |
| 9,994,798 | B2 | 6/2018 | Peitersen et al. | |
| 2002/0082185 | A1 | 6/2002 | Totoki | |
| 2003/0125226 | A1 | 7/2003 | Lewis | |
| 2004/0067866 | A1 | 4/2004 | Griese et al. | |
| 2006/0079435 | A1 | 4/2006 | Bigorra Llosas et al. | |
| 2006/0105931 | A1 | 5/2006 | Shi et al. | |
| 2006/0112972 | A1 | 6/2006 | Peitersen et al. | |
| 2006/0113506 | A1 | 6/2006 | Man et al. | |
| 2006/0166845 | A1 | 7/2006 | Terada | |
| 2006/0234890 | A1 | 10/2006 | Griese et al. | |
| 2007/0087952 | A1 | 4/2007 | Hei et al. | |
| 2007/0095003 | A1 | 5/2007 | Hei et al. | |
| 2008/0230095 | A1 | 9/2008 | McKechnie | |
| 2009/0093390 | A1 | 4/2009 | Gross et al. | |
| 2009/0226541 | A1 | 9/2009 | Scholz et al. | |
| 2009/0264329 | A1 | 10/2009 | Underwood et al. | |
| 2010/0010284 | A1 | 1/2010 | Proudlock et al. | |
| 2010/0305014 | A1 | 12/2010 | Miralles et al. | |
| 2010/0317559 | A1 | 12/2010 | Ryther et al. | |
| 2010/0317560 | A1 | 12/2010 | Ryther et al. | |
| 2010/0327560 | A1 | 12/2010 | Silva | |
| 2011/0190187 | A1 | 8/2011 | Hawest, III et al. | |
| 2011/0212866 | A1 | 9/2011 | Rao et al. | |
| 2012/0148751 | A1 | 6/2012 | Herdt et al. | |
| 2012/0204916 | A1 | 8/2012 | Laser et al. | |
| 2015/0203791 | A1 | 7/2015 | Peitersen et al. | |
| 2018/0066213 | A1 | 3/2018 | Lo et al. | |
| 2019/0169550 | A1 | 6/2019 | Hunt, Jr. et al. | |
| 2019/0241839 | A1 | 8/2019 | Flugge-Berendes et al. | |
| 2019/0330573 | A1 | 10/2019 | Man et al. | |
| 2019/0359915 | A1 | 11/2019 | Holland et al. | |
| 2020/0131453 | A1 | 4/2020 | Dahlquist Howlett et al. | |
| 2022/0183297 | A1 | 6/2022 | Bentley et al. | |

FOREIGN PATENT DOCUMENTS

| | | | | |
|---|---|---|---|---|
| EP | 0637629 | A1 | 2/1995 | |
| EP | 0875552 | A1 | 11/1998 | |
| EP | 1294839 | B1 | 3/2003 | |
| EP | 2880074 | B1 | 6/2015 | |
| EP | 3561031 | A1 * | 10/2019 | C11D 1/58 |
| GB | 1120470 | | 7/1968 | |
| JP | 2289697 | A | 11/1990 | |
| JP | 812992 | A | 1/1996 | |
| JP | H0892042 | A | 4/1996 | |
| JP | 8165498 | A | 6/1996 | |
| JP | 959677 | A | 3/1997 | |
| JP | 2004143251 | A | 5/2004 | |
| JP | 2004204055 | A | 7/2004 | |
| KR | 1020090114734 | A | 11/2009 | |
| WO | WO-9514757 | A2 * | 6/1995 | C11D 1/62 |
| WO | 9818894 | A1 | 5/1998 | |
| WO | 0018864 | A1 | 4/2000 | |
| WO | 0042147 | A1 | 7/2000 | |
| WO | 0190291 | A1 | 11/2001 | |
| WO | 2006115658 | A1 | 11/2006 | |
| WO | 2007002478 | A2 | 1/2007 | |
| WO | 2010073067 | A1 | 7/2010 | |
| WO | 2010136478 | A2 | 12/2010 | |
| WO | 2010138907 | A1 | 12/2010 | |
| WO | 2010146544 | A2 | 12/2010 | |
| WO | 2011126452 | A1 | 10/2011 | |
| WO | WO-2012067962 | A1 * | 5/2012 | C11D 3/30 |
| WO | WO-2012166902 | A1 * | 12/2012 | B81C 1/00539 |
| WO | 2017112425 | A1 | 6/2017 | |
| WO | WO-2019083643 | A1 * | 5/2019 | B08B 3/10 |

OTHER PUBLICATIONS

"JCW Spotlight on . . . Surfactants", Japan Chemical Week, 2 pages, Apr. 20, 1998.

Li et al., "Development of the formula of heavy-duty kitchen cleaner", Detergent & Cosmetics, vol. 38, No. 9, pp. 46-48, Sep. 1, 2015.

International Searching Authority in connection with PCT/US2021/060265 filed Nov. 22, 2021, "The International Search Report and the Written Opinion of the International Searching Authority, or the Declaration", 14 pages, mailed Mar. 10, 2022.

* cited by examiner

Control

Alkaline Composition

Control

Alkaline Composition

Alkaline control, 2 min

Alkaline Control, 5 min

Alkaline Control, 10 min

Multipurpose Alkaline Composition, 2 min

Multipurpose Alkaline Composition, 5 min

Multipurpose Alkaline Composition, 10 min

MULTIPURPOSE ALKALINE COMPOSITIONS AND METHODS OF USE

CROSS-REFERENCE TO RELATED APPLICATIONS

This application claims priority under 35 U.S.C. § 119 to U.S. Provisional Application Ser. No. 63/198,957, filed Nov. 25, 2020, which is herein incorporated by reference in its entirety including without limitation, the specification, claims, and abstract as well as any figures, tables, or examples thereof.

This application is also related to U.S. patent application Ser. No. 17/249,793, entitled Multipurpose Acidic Compositions and Methods of Use, filed concurrently herewith. The entire contents of this patent application are hereby expressly incorporated herein by reference, including without limitation, the specification, claims, and abstract, as well as any figures, tables, or drawings thereof.

FIELD OF THE INVENTION

The invention relates to multipurpose alkaline compositions for cleaning, including de-greasing, de-staining, and/or de-liming, and/or sanitizing. The multipurpose alkaline compositions are liquids that are suitable for use as pre-sprays (i.e., spot treatment) to beneficially remove polymerized soils, de-stain, remove hard water deposits and/or otherwise assist in general cleaning of difficult soils. The multipurpose alkaline compositions can be used for pre-treatments for machine and manual warewash in order to enhance performance of general-purpose products without the inclusion of costly additives in conventional specialty detergents. The multipurpose alkaline compositions can include at least one non-hydroxide alkaline source, at least one surfactant, a chelant and a solvent system. The multipurpose alkaline compositions can be PPE free compositions. Methods for using the multipurpose alkaline compositions as pre-treatments, soaks and/or application in machine and manual warewash are also provided. Methods for using the multipurpose alkaline compositions for removing tea stains, coffee stains, hard water scale/deposits, polymerized oils, carbonized soils, baked on soils, fats, oils, and cosmetics are also provided.

BACKGROUND OF THE INVENTION

Detergents and general-purpose cleaners generally have an alkaline pH. Detergents and other cleaning compositions, such as warewash detergents, are often formulated with many actives to accomplish specific outcomes on various soils. Formulations containing these specialty additives are costly. They are also not needed for all markets and types of cleaning, de-greasing, de-staining, de-liming and/or sanitizing. As a result, often specialty cleaning compositions or formulation to include certain specialty additives are not needed for all applications and/or markets.

It is therefore an object of this disclosure to provide a multipurpose alkaline composition that can be used as a pre-spray or spot treatment composition to remove difficult soils, including polymerized soils, de-stain, and assist in general cleaning of other difficult soils. It is unexpected that the multipurpose alkaline compositions are able to remove more soils than the polymerized soils.

It is a further object of the disclosure to provide a multipurpose alkaline composition that can be used as a pre-treatment for machine and manual warewash to enhance or boost performance of general-purpose products, thereby reducing the use of specialty additives in detergent compositions.

It is another object of this disclosure to formulate multipurpose alkaline compositions that are PPE free products.

It is another object of this disclosure to formulate multipurpose alkaline compositions that remove challenging soils including tea stains, coffee stains, hard water scale/deposits, polymerized oils, carbonized soils, baked on soils, fats, oils, cosmetics, and others.

Other objects, aspects and advantages of this invention will be apparent to one skilled in the art in view of the following disclosure, the drawings, and the appended claims.

SUMMARY OF THE INVENTION

The present disclosure relates to multipurpose alkaline cleaning compositions and uses thereof. In an embodiment, the multipurpose alkaline cleaning composition comprises from about 1 wt-% to about 50 wt-% non-hydroxide alkalinity source; from about 1 wt-% to about 50 wt-% surfactant; from about 1 wt-% to about 75 wt-% solvent or solvent system; and from about 0.5 wt-% to about 25 wt-% chelant; wherein a use solution of the composition has a pH less than about 11.5; and wherein the composition provides substantially similar or superior cleaning efficacy compared to hydroxide-based and corrosive, highly alkaline compositions.

In an embodiment, a method of cleaning and/or degreasing is provided. The method comprises: applying to a surface or object in need of cleaning and/or degreasing the alkaline composition according to the disclosures herein, and removing soils, stains, and/or hard water deposits from the surface or object. In an embodiment, the composition penetrates soils more quickly than an alkaline control composition that does not comprise the chelant. While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
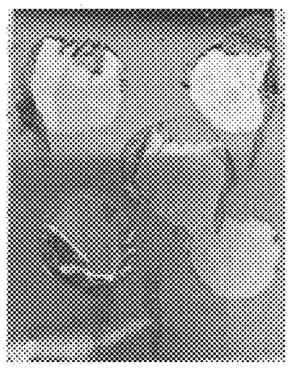
FIGS. 1A-1B show photographs of a drop test using a Control formulation (FIG. 1A) compared to a multipurpose alkaline composition (FIG. 1B) on stainless steel coupons for efficacy in speed to penetrate and remove corn oil soil on the coupons as described in Example 1.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular multipurpose alkaline compositions and methods of using the same, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g., 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal, bleaching, microbial population reduction, and any combination thereof.

The term "corrosive," as used herein, refers to products in a use solution having a pH greater than about 11.5 without additional evidence of non-corrosive effects. However, as one skilled in the art will ascertain, a composition having a pH below 11.5 may be considered corrosive based upon testing (e.g., animal testing to confirm toxicology of a composition). Likewise, some compositions may be considered non-corrosive with a pH above 11.5 as a result of test data or consideration of buffering capacities (i.e., acid/alkali reserve). Classifications and testing for "corrosive" formulations are based upon corrosive or irritant effects of a substance and/or formulation. Further description of testing requirements (including either animal or human data) is available from various regulatory agencies at the time of the effective filing date, including for example European Commission, Enterprise and Industry Directorate-General, Position Paper of DG ENTR/G2 on the Classification and Labeling of Preparations with Extreme pH Values ($11.5<pH<2$) (2007).

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces, food processing surfaces, bathroom surfaces, and the like, and may be interior or exterior.

The term "hydroxide-based and corrosive" refers to a control formulation against which efficacy of the compositions provides at least substantially similar cleaning efficacy, or superior cleaning efficacy in comparison. The hydroxide-based and corrosive compositions serving as a control for comparison of the multipurpose alkaline cleaning compositions require hydroxide (e.g., alkali metal hydroxide such as sodium hydroxide) and are highly alkaline compositions, namely pH greater than 11.5, or greater than about 12.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a corrosive, greater pH cleaning composition (such as a hydroxide-based alkaline composition) to address a typical soiling condition on a typical substrate as described herein. This degree of cleanliness may, depending on the particular cleaning product and particular substrate, correspond to a general absence of visible soils, or to some lesser degree of cleanliness.

The term "surfactant" or "surface active agent" refers to an organic chemical that when added to a liquid change the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components, or ingredients, but only if the additional steps, components, or ingredients do not materially alter the basic and novel characteristics of the claimed methods and compositions.

Multipurpose Alkaline Compositions

The multipurpose alkaline compositions include non-hydroxide alkalinity source(s), surfactant(s), chelant(s), a solvent and/or solvent system, and water. The multipurpose alkaline compositions can include additional functional ingredients and can be provided as concentrate or use compositions. Exemplary multipurpose alkaline compositions are shown in Table 1 in weight percentage. The compositions are provided as concentrate compositions that can be used for pre-treatment, such as for direct application to a soil, or can be further diluted in a cleaning and/or sanitizing application. The multipurpose alkaline compositions are beneficially formulated as concentrates (e.g., First Exemplary Range) or can be further diluted to a use concentrate or ready-to-use (RTU) formulation (e.g., Third Exemplary Range).

TABLE 1

| Material | First Exemplary Range wt. -% | Second Exemplary Range wt. -% | Third Exemplary Range wt.-% |
|---|---|---|---|
| Non-hydroxide alkalinity source(s) | 1-50 | 5-50 | 5-40 |
| Surfactant(s) | 1-50 | 2-50 | 2-25 |
| Chelant(s) | 0.5-25 | 0.5-20 | 0.5-10 |
| Solvent and/or Solvent System | 1-75 | 1-50 | 1-25 |
| Water | 10-90 | 20-90 | 40-90 |
| Additional Functional Ingredients | 0-50 | 0-25 | 0-20 |
| Total | 100 | 100 | 100 |

Beneficially, according to embodiments the pH of the multipurpose alkaline compositions use solution is less than about 11.5, less than about 11, less than about 10.5 or less than about 10. In other embodiments, the pH of the multipurpose alkaline compositions is from about 10-11.5. The multipurpose alkaline compositions provide significant safety benefits as a result of the lower, non-corrosive pH range while providing substantially similar cleaning efficacy, and in many embodiments superior cleaning efficacy to traditional degreasing compositions, as well as providing additional cleaning and/or sanitizing benefits beyond degreasing applications. In further embodiments, the multipurpose alkaline compositions having a pH below about 11.5 do not require PPE, while unexpectedly providing the same or substantially similar degreasing efficacy for soil removal as compositions having pH above about 11.5 and/or compositions including caustic. In other aspects, the multipurpose alkaline compositions provide superior degreasing efficacy, along with stain removal and hard water deposit removal.

Alkalinity Source

The multipurpose alkaline compositions include at least one non-hydroxide alkalinity source. Examples of suitable alkaline sources for use in the compositions include amines, alkanol amines, carbonates, and silicates. For example, the source of alkalinity can include sodium silicate, sodium metasilicate, sodium orthosilicate, sodium phosphate, sodium polyphosphate, sodium borate, sodium carbonate, potassium silicate, potassium metasilicate, potassium orthosilicate, potassium phosphate, potassium polyphosphate, potassium borate, potassium carbonate, lithium silicate, lithium metasilicate, lithium orthosilicate, lithium phosphate, lithium polyphosphate, lithium borate, lithium carbonate, 2-(2-aminoethoxy)ethanol, monoethanolamine, diethanolamine, triethanolamine, mixed isopropanolamines, morpholine, n,n-dimethyl ethanolamine and combinations thereof.

Exemplary embodiments of the multipurpose alkaline compositions include use of an alkanol amine, preferably monoethanolamine, diethanolamine, 2-amino-2-methyl-1-propanol, monoisopropanol amine, diisopropanolamine and/or 2-(2-Aminoethoxy)ethanol for the alkalinity source. According to an embodiment, the alkanol amine alkaline source is a monoethanolamine, diethanolamine, monoisopropanol amine, 2-(2-Aminoethoxy)ethanol or combinations thereof. Particularly preferred alkaline sources include monoethanolamine and/or 2-(2-Aminoethoxy)ethanol. Without being limited to a particular mechanism of action, the monoethanolamine beneficially penetrates soiled surfaces or objects and can further provide additional solvent activity.

According to a further embodiment, the alkanol amines alkaline source (or combination of sources) is formulated to maximize the monoethanolamine content without exceeding the maximum permissible concentration for acceptable product VOC limits. As a result, the monoethanolamine concentration is maximized to provide enhanced cleaning potential of the multipurpose alkaline composition without exceeding the acceptable VOC limits.

In some embodiments, the concentrate multipurpose alkaline compositions comprise about 1 wt-% to about 50 wt-%, from about 5 wt-% to about 50 wt-%, from about 5 wt-% to about 40 wt-%, or from about 5 wt-% to about 30 wt-% of the at least one source of non-hydroxide alkalinity. It is to be understood that all values and ranges between these values and ranges are encompassed by the present invention as well as dilutions of the concentrate. Beneficially, the multipurpose alkaline compositions are free of hydroxide alkalinity (i.e., do not include a hydroxide alkalinity source), including sodium hydroxide or other caustic alkaline earth metal hydroxide sources.

Surfactants

The multipurpose alkaline compositions include at least one surfactant. Suitable surfactants can include anionic, cationic, amphoteric, zwitterionic, and/or nonionic surfactants. The emulsifying properties of surfactants can be used for both a concentrate that can be diluted to create a usable cleaning and/or sanitizing product (use dilution) and the use dilution itself. The surfactant or mixture of surfactants can have foaming or defoaming characteristics suitable for a desired cleaning and/or sanitizing application. The surfactant or surfactant system can be selected depending upon the particular soil, e.g., polymerized soil, that is to be removed.

Anionic surfactants suitable for use with the multipurpose alkaline compositions include alkylbenzene sulfonates, such as linear alkylbenzene sulfonates, alkyl carboxylates, paraffin sulfonates and secondary n-alkane sulfonates, sulfosuccinate esters and sulfated linear alcohols. Additional sulfonated anionics include alkyl sulfonates or disulfonates, alkyl aryl sulfonates, alkyl naphthalene sulfonates, alkyl diphenyl oxide disulfonates, and the like. In an embodiment linear alkylbenzene sulfonates (LAS) or linear alkylbenzene sulfonic acids (LABSA) are preferred as the anionic surfactant.

Zwitterionic or amphoteric surfactants suitable for use with the multipurpose alkaline compositions include beta-N-alkylaminopropionic acids, n-alkyl-beta-iminodipropionic acids, imidazoline carboxylates, n-alky-betaines, amine oxides, sulfobetaines and sultaines.

Nonionic surfactants suitable for use with the multipurpose alkaline compositions include alcohol alkoxylates having EO, PO and BO blocks, fatty acid alkoxylate, alkyl phenol alkoxylates, and polyether (also known as polyalkylene oxide, polyoxyalkylene or polyalkylene glycol) compounds. More particularly, the polyether compounds are generally polyoxypropylene or polyoxyethylene glycol compounds. Typically, the surfactants suitable for use with the multipurpose alkaline compositions are synthetic organic polyoxypropylene (PO)-polyoxyethylene (EO) block copolymers. These surfactants have a diblock polymer comprising an EO block and a PO block, a center block of polyoxypropylene units (PO), and having blocks of polyoxyethylene grated onto the polyoxypropylene unit or a center block of EO with attached PO blocks.

Cationic surfactants suitable for use with the multipurpose alkaline compositions can include alkylamines and their salts, alkyl imidazolines, ethoxylated amines, and quaternaries, such as alkylbenzyldimethylammonium salts, alkyl benzene salts, heterocyclic ammonium salts, tetra alkylammonium salts, and the like. Cationics further include compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom. Additional description can be in “Surfactant Encyclopedia”, Cosmetics & Toiletries, Vol. 104 (2) 86-96 (1989) and U.S. Pat. No. 9,663,431, which are herein incorporated by reference in its entirety.

Amphoteric surfactants suitable for use with the multipurpose alkaline compositions include derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in “Surfactant Encyclopedia” Cosmetics & Toiletries, Vol. 104 (2) 69-71 (1989) and U.S. Pat. No. 9,663,431, which are herein incorporated by reference in its entirety. The first class includes acyl/dialkyl ethylenediamine derivatives (e.g., 2-alkyl hydroxyethyl imidazoline derivatives) and their salts. The second class includes N-alkylamino acids and their salts. Some amphoteric surfactants can be envisioned as fitting into both classes.

Surfactants that can be used include anionic, cationic, amphoteric, zwitterionic, and/or nonionic surfactants, which are commercially available from a number of sources. For a discussion of surfactants, see Kirk-Othmer, Encyclopedia of Chemical Technology, Third Edition, volume 8, pages 900-912. Surfactants can be used alone or in combination. In an embodiment, nonionics and anionics are used in combination. The semi-polar nonionic, cationic, amphoteric and zwitterionic surfactants can be employed in combination with nonionics or anionics. The above examples are merely specific illustrations of the numerous surfactants which can find application within the scope of the multipurpose alkaline compositions. It should be understood that the selection of particular surfactants or combinations of surfactants can be based on a number of factors including compatibility with the surface or object to be cleaned at the intended use concentration and the intended environmental conditions including temperature and pH.

In a preferred embodiment, the surfactant is an anionic alkylbenzene sulfonate. In an embodiment, the surfactant is a linear alkyl benzene sulfonate and is combined with the solvent (e.g., benzyl alcohol) for a preferred alkaline composition.

In some embodiments, the multipurpose alkaline compositions comprise from about 1 wt-% to about 50 wt-%, from about 1 wt-% to about 45 wt-%, from about 2 wt-% to about 50 wt-%, from about 2% to about 25 wt-% of surfactant, or from about 2% to about 10 wt-% of surfactant. It is to be understood that all values and ranges between these values and ranges are encompassed by the present invention.

Solvents and Solvent Systems

The multipurpose alkaline compositions include at least one solvent or a solvent system. In various embodiments, the multipurpose alkaline compositions may include a solvent that also functions as a cleaning agent. The solvent or solvent system can be used for enhancing the cleaning properties of the multipurpose alkaline composition as well as to provide emulsifying properties of a given composition. For example, the solvent system may keep hydrophilic and hydrophobic components of the specific composition from separating. The emulsifying properties can be used for both a concentrate that can be diluted to create a usable cleaning product (use solution) and the use dilution itself.

Exemplary solvents and solvent systems may include one or more different solvents including aromatic alcohols, alkanol amines, glycol ethers, ether amines, esters, and mixtures thereof. In some embodiments, where an alkanol amine is included, it can provide both the alkalinity source and provide further benefits as a solvent. In some embodiments, distinct alkalinity sources and solvents are not required. In other embodiments, both an alkalinity source and a distinct solvent are included in the compositions.

Representative solvents may include acetamidophenol, acetanilide, acetophenone, 2-acetyl-1-methylpyrrole, benzyl acetate, benzyl alcohol, methyl benzyl alcohol, alpha phenyl ethanol, benzyl benzoate, benzyloxyethanol, ethylene glycol phenyl ether (commercially available as "DOWANOL EPh" from Dow Chemical Co.), propylene glycol phenyl ether (commercially available as "DOWANOL PPh" from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

Preferred solvents for wetting of soils, such as difficult to remove soils, such as polymerized non-trans-fat soils, include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof.

According to an embodiment, the solvent or solvent system includes at least one aromatic alcohol (e.g., benzyl alcohols, phenyl alcohols). Preferably the aromatic alcohol solvent system is benzyl alcohol. The solvent may further include solvents in similar limited water solubility range as benzyl alcohol, including for example benzyloxyethanol and/or benzyloxypropanol.

According to a further embodiment, the solvent system may include benzyl acetate, benzyl alcohol, methyl benzyl alcohol, alpha phenyl ethanol, benzyl benzoate, benzyloxyethanol and/or the like. Additional description of solvent systems that may be included in the compositions are disclosed in U.S. Patent Publication No. 2010/0317559, incorporated herein by reference in its entirety.

In some embodiments, the multipurpose alkaline compositions include from about 1 wt-% to about 90 wt-%, from about 1 wt-% to about 75 wt-%, from about 1 wt-% to about 50 wt-%, or from about 1 wt-% to about 25 wt-% of a solvent system. It is to be understood that all values and ranges between these values and ranges are encompassed by the present invention.

Chelants

The multipurpose alkaline compositions include at least one chelant. In general, a chelant or chelating agent is a molecule capable of coordinating (i.e., binding) the metal ions commonly found in water sources to prevent the metal ions from interfering with the action of the other ingredients.

Examples of chelating agents include phosphonic acid and phosphonates, phosphates, gluconic acid and gluconates, aminocarboxylates and their derivatives, pyrophosphates, ethylenediamine and ethylenetriamine derivatives, hydroxyacids, and mono-, di-, and tri-carboxylates and their corresponding acids. In certain embodiments the composition is phosphate free.

Exemplary chelants include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS).

In a preferred embodiment, a sustainable biodegradable polymer chelant is employed in the compositions. In an embodiment, the sustainable biodegradable polymer chelant is EDTA, MGDA or GLDA.

The chelant employed must be capable of and included in concentrations sufficient to coordinate (i.e., bind) the metal ions commonly found in water sources. For example, formulations that teach use of chelants for corrosion inhibition, such as in U.S. Publication 2019/0169550, are not used at concentrations that would provide cleaning efficacy is employed in the multipurpose alkaline compositions.

In some embodiments, the multipurpose alkaline compositions include from about 0.5 wt-% to about 50 wt-%, from about 0.5 wt-% to about 25 wt-%, from about 0.5 wt-% to about 20 wt-%, from about 0.5 wt-% to about 10 wt-%, or from about 1 wt-% to about 10 wt-% of a chelant(s). It is to be understood that all values and ranges between these values and ranges are encompassed by the present invention.

Additional Functional Ingredients

The components of the multipurpose alkaline compositions can further be combined with various functional components suitable for uses disclosed herein. In some embodiments, the multipurpose alkaline compositions including the non-hydroxide alkalinity source(s), surfactant(s), chelant(s), a solvent and/or solvent system, and water make up a large amount, or even substantially all of the total weight of the compositions. For example, in some embodiments few or no additional functional ingredients are disposed therein.

In other embodiments, additional functional ingredients may be included in the multipurpose alkaline compositions. The functional ingredients provide desired properties and functionalities to the compositions. For the purpose of this application, the term “functional ingredient” includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the multipurpose alkaline compositions may include optical brighteners, defoaming agents, anti-redeposition agents, bleaching agents, solubility modifiers, buffers, tracers, dispersants, metal protecting agents, soil antiredeposition agents, stabilizing agents, corrosion inhibitors, additional chelating agents, enzymes, aesthetic enhancing agents including fragrances and/or dyes, additional rheology and/or solubility modifiers or thickeners, hydrotropes or couplers, buffers, solvents, additional cleaning agents and the like.

In some embodiments, the multipurpose alkaline compositions may include one or more of a dye (i.e., for product safety/identification), fragrance, thickener, corrosion inhibitor and/or enzyme. According to a further embodiment, various thickeners could be employed in the compositions. Suitable thickeners may include, for example, gums (i.e., xanthan, carrageenan, etc.), polymers (i.e., polyacrylates and similar modified polymers), inorganic particles (i.e., clay silicates), and/or surfactants for the purpose of providing viscosity. Various additional additives suitable for use in the compositions are disclosed in U.S. Pat. No. 6,916,773 and U.S. Patent Publication Nos. 2010/0317 and 2010/0317559, which are incorporated herein by reference in their entirety.

In preferred embodiments, the multipurpose alkaline compositions do not include a rheology modifier (e.g., cellulose). In preferred embodiments, the composition does not require rheology modification. In preferred embodiments, the compositions do not include polyester components.

In embodiments, the additional ingredients can be preformulated with the multipurpose alkaline compositions or added to the use solution before, after, or substantially simultaneously with the addition of the compositions. Additionally, the compositions can be used in conjunction with one or more conventional cleaning and/or sanitizing agents or compositions.

According to embodiments, the various additional functional ingredients may be provided in the compositions in the amount from about 0 wt-% and about 50 wt-%, from about 0 wt-% and about 40 wt-%, from about 0 wt-% and about 30 wt-%, from about 0 wt-% and about 25 wt-%, from about 0 wt-% and about 20 wt-%, 0.1 wt-% and about 50 wt-%, from about 0.1 wt-% and about 40 wt-%, from about 0.1 wt-% and about 30 wt-%, from about 0.1 wt-% and about 25 wt-%, from about 0.1 wt-% and about 20 wt-%, from about 0.1 wt-% and about 10 wt-%, from about 0.1 wt-% and about 5 wt-%, from about 1 wt-% and about 50 wt-%, from about 1 wt-% and about 40 wt-%, from about 1 wt-% and about 30 wt-%, from about 1 wt-% and about 25 wt-%, from about 1 wt-% and about 20 wt-%, from about 1 wt-% and about 10 wt-%, or from about 1 wt-% and about 5 wt-%. In addition, without being limited according to the invention, all ranges recited are inclusive of the numbers defining the range and include each integer within the defined range.

Use Solutions

According to an embodiment, a use dilution of the concentrate multipurpose alkaline compositions can range from a RTU formulation that does not require further dilution to about 1:10 dilution of the concentrate to solvent. Dilution ranges in between are also suitable. More preferably, a use dilution of about 1:3 to about 1:6 is obtained from the concentrate composition. As one skilled in the art will ascertain as a result of the disclosure herein, a use solution can be generated according to the particular needs of a user and its application. For example, the multipurpose alkaline compositions may be diluted to a use solution that has a particular VOC limit and/or ethanolamine concentration.

In some embodiments, a dilution step may be initially employed to provide a water source to the concentrated composition suitable for generating a use solution or use composition. In some aspects, the concentrated multipurpose cleaning composition may be diluted at a dilution factor between approximately 1 to about 22 ounces liquid concentrate per gallon of water diluent, from about 1 to about 12 ounces liquid concentrate per gallon of water diluent, or from about 8 to about 10 ounces liquid concentrate per gallon of water diluent. In some aspects, the dilution step occurs at or near a point of use, and may include for example use of a water source that is provided using an aspirator or other dilution mechanism known to the art. In other aspects, when the cleaning composition is employed in a diluted (or a use solution or composition) formulation no further dilution is required by a user.

Methods of Use

The multipurpose alkaline compositions are suited for cleaning, sanitizing and/or disinfecting various surfaces and objects. Multipurpose compositions, as the name implies, are intended to be used on multiple types of surfaces and multiple types of soils. The multipurpose alkaline compositions are efficacious in cleaning and removing soils from such surfaces and objects, including for example difficult to remove soils, including polymerized soil, carbonized soil, baked on soil, and/or other fat soils. These often include polymerized fat soils, such as polymerized zero trans-fat soils including corn oil. While an understanding of the mechanism is not necessary to practice the methods of use described herein, it is contemplated that, in some embodiments, the solvent or solvent system (e.g., benzyl alcohol) provides a limited water-soluble alcohol providing hydrophobicity that adds affinity towards greasy soils and acts as a plasticizer. The soils, upon contact with the multipurpose alkaline compositions, swell and lose adhesion from the substrate, providing a unique cleaning approach in comparison to the use of caustic degreasers.

Beneficially, the multipurpose alkaline compositions have a lower pH than traditional degreasing compositions while providing substantially similar cleaning efficacy. In embodiments, the compositions have a pH less than about 11.5 and do not include hydroxide alkalinity. Beneficially, the pH of the composition in use solution is less than about 11.5, less than about 11, less than about 10.5 or less than about 10. In other embodiments the pH of the compositions in a use solution is from about 10 to about 11.5. The compositions provide significant safety benefits as a result of the lower pH range while providing substantially similar cleaning efficacy, and in many embodiments superior cleaning efficacy to traditional degreasing compositions.

According to preferred embodiments, the compositions having a pH below about 11.5 do not require PPE, while unexpectedly providing the same or substantially similar degreasing efficacy for soil removal as compositions having pH above about 11.5 and/or compositions including hydroxide (i.e., caustic) alkalinity sources. In other aspects, the compositions provide superior degreasing efficacy. As a result of the concentrate formulations, the non-aqueous concentrates do not provide a meaningful pH measurement and therefore pH measurements referenced herein relate to the use solution resulting from the concentrate.

The multipurpose alkaline compositions act quickly to remove soils, such as polymerized fat soils. The fast penetrating of the soils allows the compositions to be used a pretreatment that does not require extended dwell or pretreatment time. In an embodiment, the compositions achieve degreasing action within about approximately 5 seconds to a few minutes of contact to a soiled surface or object. According to a preferred embodiment, application of the compositions results in soil removal within about seconds without requiring substantial mechanical action or excessive temperatures. The methods result in cleaning efficacy that is at least substantially similar to with the use of a hydroxide-based and corrosive, highly alkaline compositions of the prior art. In a further embodiment, the methods of cleaning and/or degreasing result in the compositions penetrating soils more quickly than an alkaline control composition that does not comprise the chelant. As referred to herein, an alkaline control composition can include either a hydroxide-based alkaline composition or a non-hydroxide composition with a substantially equivalent solvent or solvent system and surfactant but does not include a chelant.

The multiuse alkaline compositions are particularly well suited for use as a multipurpose de-greasing and de-staining composition. The de-staining can include removal of difficult stains such as tea and coffee stains. These multipurpose benefits are particularly useful as a multipurpose kitchen spot treatment. Beneficially, such multipurpose benefits provide a single cleaning application instead of formulating detergents to remove stains and polymerized soils (also including carbonized soils and fats).

The multiuse alkaline compositions are particularly well suited for use as a multipurpose de-greasing, de-liming (i.e., hard water spots), and de-staining composition. The de-staining can include removal of difficult stains such as tea and coffee stains. These multipurpose benefits are particularly useful as a multipurpose kitchen spot treatment. Beneficially, such multipurpose benefits provide a single cleaning application instead of formulating detergents to remove stains, polymerized soils (also including carbonized soils and fats), and hard water spots.

In some embodiments, the de-staining of surfaces or objects with the multipurpose alkaline composition is achieved within less than about 10 minutes, less than about 5 minutes, less than about 4 minutes, less than about 3 minutes, less than about 90 seconds, or less than about 60 seconds of contacting time. As referred to herein, stains can include difficult to remove stains from tea, coffee, and the like.

In some embodiments, the soil removal of surfaces or objects with the multipurpose alkaline composition is achieved within less than about 10 minutes, less than about 5 minutes, less than about 4 minutes, less than about 3 minutes, less than about 2 minutes, less than about 60 seconds, or less than about 45 seconds of contacting time.

Exemplary industries in which the present methods can be used include but are not limited to: food service industry; food and beverage industry; consumer degreasing applications; oil processing industry; industrial agriculture and ethanol processing; and the pharmaceutical manufacturing industry. Suitable use for the compositions and methods of the invention may include, for example, oven cleaner, including microwave ovens, general degreaser, fryer degreaser, smokehouse cleaner, floor cleaner, exhaust hood cleaner, drain cleaner, floor finish remover, floor cleaner, fryer cleaner, pot and pan cleaner, carpet spotter, pharmaceutical and cosmetics cleaner, instrument cleaner, tar remover, and the like. Beneficially the compositions are not corrosive and can be used on various metals including stainless steel and aluminum.

As a further benefit, the multipurpose alkaline compositions are also able to remove other soils from surfaces or objects beyond the polymerized fat soils, due in part to the formulation employing a chelant. In an additional embodiment, the multipurpose alkaline compositions can be used in any other methods seeking to remove polymerized soils, difficult to remove stains (e.g., tea, coffee, and the like) and/or hard water scaling without requiring the use of hydroxide-based or corrosive formulations, such as removing polymerized or cross-linked films from floors and other finishes. In such an embodiment, methods of use of the composition as a floor stripper and/or floor cleaner may be employed. In an embodiment, methods of use include removing soils from interior and/or exterior floors. In such an embodiment, the floor may comprise concrete, for example outside a drive thru wherein oil and grease soils may be present. In a further embodiment, methods of using the composition as a multipurpose formulation are employed, unexpectedly demonstrating efficacy in non-traditional applications of a non-hydroxide alkalinity composition.

The present methods can also be used to remove soils other than polymerized soils. Such other soils include, but are not limited to, starch, cellulosic fiber, protein, simple carbohydrates, and combinations of any of these soil types with mineral complexes. Examples of specific food soils that are effectively removed using the present methods include, but are not limited to, soils generated in the manufacture and processing meat, poultry, vegetables and fruit, bakery goods, soft drinks, brewing and fermentation residues, soils generated in sugar beet and cane processing and processed foods containing these ingredients and associated ingredients such as juices, sauces, and condiments (e.g., fruit juices, ketchup, tomato sauce, barbeque sauce). These soils can develop on environmental surfaces such as walls and floors, freezers and cooling systems, heat exchange equipment surfaces, conveyor surfaces and on other surfaces during the manufacturing and packaging process.

The multipurpose alkaline compositions can be further employed in various antimicrobial applications. The antimicrobial efficacy can be employed for sanitizing and/or disinfecting using the cleaning composition. In such embodiments, the multipurpose alkaline compositions further comprise or are used in combination with a biocide. For example, in an embodiment the multipurpose alkaline compositions further comprise an additional surfactant, such as a cationic surfactant, including for example, quaternary ammonium compounds such as alkylbenzyldimethylammonium salts, alkyl benzene salts, heterocyclic ammonium salts, tetra alkylammonium salts, and the like. Use for sanitizing provides antimicrobial efficacy against a broad spectrum of microorganisms, providing broad spectrum bactericidal and fungistatic activity. For example, the broad-spectrum activity can include activity against wide range of different types of microorganisms (including both aerobic and anaerobic microorganisms, gram positive and gram-negative microorganisms), including bacteria, yeasts, molds, fungi, algae, and other problematic microorganisms. Sanitizing methods can be used to achieve any suitable reduction of the microbial population in and/or on the surface or object, including reducing the microbial population by at least one log 10, at least two log 10, at least three log 10, at least four log 10, or at least five log 10. Without limiting the scope of invention, the numeric ranges are inclusive of the numbers defining the range and include each integer within the defined range.

The multipurpose alkaline compositions can be further employed in treating soils on a textile or laundry substrate surface, namely a pre-spotting treatment. In such embodiments, the compositions can be a spot treatment or pretreatment step before the textile or surface is placed into a laundry machine for further cleaning with a laundry detergent.

In embodiments, the compositions can be used as a RTU concentrate or a use solution.

In embodiments, the compositions can be used as a pretreatment, soak, or spray. The composition or use solutions thereof can be applied using a variety of methods and conventional application techniques, which will vary depending upon the application as a soak, spray, or the like. These methods can operate on an object, surface, or the like, by contacting the object or surface with the composition. Contacting can comprise any of numerous methods for applying a liquid, such as spraying the compound, immersing the object in the compound, foam or gel treating the object with the compound, or a combination thereof. Without being limited to the contacting method, a concentrate or use composition can be applied to or brought into contact with an object or surface by any conventional method or apparatus for applying a liquid composition to an object. For example, the surface can be wiped with, sprayed with, foamed on, and/or immersed in the compositions, or use compositions made from the concentrated compositions. The liquid compositions can be sprayed, foamed, or wiped onto a surface; the compound can be caused to flow over the surface, or the surface can be dipped into the compound. Contacting can be manual or by machine.

A particularly well-suited method for applying or contacting the compositions to a stained or soiled surface is through the use of a manually operated spray-dispensing container. The spray-dispensing container preferably includes a spray nozzle, a dip tube and associated pump dispensing parts, providing convenient application to stained or soiled surfaces or objects.

The various methods include a step of contacting a surface in need of cleaning and/or degreasing with the compositions for a sufficient amount of time such that the composition penetrates into the soil to be removed. The length of time required for soil penetration will depend on the thickness of the soil as well as the relative polymerization level of the soil. In such cases, it is preferable that the composition includes a high foaming surfactant system or a thickening system so that the composition does not dry out and remains hydrated on the surface for an extended period of time.

The multipurpose alkaline compositions can be in contact with a surface or object for a sufficient amount of time to clean the surface or object. In an aspect, the surface or object is contacted with the composition for at least about 10 seconds, 30 seconds, 1 minute, at least about 10 minutes, or between about 10 minutes and about 20 minutes. In an aspect, a use concentration of the multipurpose alkaline compositions includes between about 1 to about 22 ounces liquid concentrate per gallon of water diluent, from about 1 to about 12 ounces liquid concentrate per gallon of water diluent, or from about 8 to about 10 ounces liquid concentrate per gallon of water diluent, including all ranges therebetween, including all ranges therebetween. In an aspect, a use concentration of the multipurpose alkaline compositions includes from about 1 wt-% to about 20 wt-%, including all ranges therebetween.

The methods can further optionally include a step of wiping off the treated surface or object with a rag, towel, sponge, or other item (e.g., a disposable paper towel or sponge). In other embodiments this step is not require, as the surface or object may be placed into a washing machine or ware washing machine for further treatment with a detergent composition. In some embodiments involving heavy soil deposits or stains, the composition may be left on the soiled surface until it has effectively loosened the soil deposits or stains, after which it may be wiped off, rinsed off, or otherwise removed. For particularly heavy deposits of such undesired stains, multiple applications may also be used.

The methods can further optionally include using mechanical force during the contacting step. For example, for removing certain soils or stains from the surface or object additional force may need to be applied, e.g., applying a water source and/or mechanical force to assist in removing soils.

The methods can further optionally include a step of rinsing off the treated surface or object with water. In yet other embodiments the composition is wiped off the soiled surface, effectively removing the soils and any remaining composition. In further aspects, there is no need for a rinse step.

The compositions can be applied following a step of heating the composition to a temperature of about 40° F. or above, 40° F. to about 130° F. In other embodiments, the methods provide for soil removal from surfaces or objects at an ambient or room temperature, e.g., about 50° F. to about 100° F. It is preferred in various embodiments that neither the surface or object nor the composition is heated before the contacting step. In still other cases, methods provide for soil removal from surfaces or objects at colder temperature, e.g., about 25° F. to about 50° F. In other cases, the methods may require applying to surfaces or objects that range in temperature from 0° F. to about 200° F.

The compositions and methods described herein beneficially remove stains and/or soils and/or lime (hard water deposits) by at least about 70%, at least about 75%, at least about 80%, and preferably at least about 90% or at least about 95%. Beneficially, the composition and methods described herein provide substantially similar or superior cleaning efficacy compared to hydroxide-based and corrosive, highly alkaline compositions.

In exemplary embodiments, the compositions and methods beneficially remove stains from various surfaces and provide at least about 70% stain removal, at least about 75% stain removal, at least about 80% stain removal, and preferably at least about 90% stain removal or at least about 95% stain removal. In still further embodiments, the compositions and methods beneficially remove 100% of stains from the treated surface.

In further exemplary embodiments, the compositions and methods beneficially remove soils from various surfaces and provide at least about 70% soil removal, at least about 75% soil removal, at least about 80% soil removal, and preferably at least about 90% soil removal or at least about 95% soil removal. In still further embodiments, the compositions and methods beneficially remove 100% of soil from the treated surface.

In still further exemplary embodiments, the compositions and methods beneficially remove lime scale (hard water deposits) from various surfaces and provide at least about 70% lime scale removal, at least about 75% lime scale removal, at least about 80% lime scale removal, and preferably at least about 90% lime scale removal or at least about 95% lime scale removal. In still further embodiments, the compositions and methods beneficially remove 100% of lime scale from the treated surface.

In certain embodiments, the multipurpose alkaline compositions include the chelant methylglycine-N—N-diacetic acid trisodium salt (MGDA) and beneficially provide at least about 80% to about 100% soil removal of protein soils, grease soils, stains, or lime scale from a treated surface having the protein soil, grease soil, stain, or lime scale. In further embodiments, the rate of penetrating the soil and thereby removing the soil is increased (i.e., faster) in comparison to an alkaline control composition that does not include the chelant or a hydroxide-based and corrosive, highly alkaline composition. It is particularly useful that the compositions and methods provide the efficacious soil removal as a hydroxide-free and PPE-free composition for pretreatment, spot treatment, and/or soil removal in a warewash application.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The Control and Multipurpose alkaline compositions utilized in the Examples are shown in Table 2:

TABLE 2

| Description | Control Wt-% | Multipurpose alkaline composition (Control + Chelant) Wt-% |
|---|---|---|
| Non-hydroxide alkalinity | 1-10 | 1-10 |
| Anionic surfactant (Dodecyl Benz Sulfonic Acid, 96%) | 0.5-5 | 0.5-5 |
| Solvent | 5-15 | 5-15 |
| Aminocarboxylate Chelant | 0 | 0.5-2.5 |
| Additional functional ingredient | <1 | <1 |
| Water Zeolite Softened | Remainder | Remainder |
| Total wt-% Composition | 100 | 100 |

Example 1

A control formulation (see Control in Table 2) used for removing grease stains and polymerized soils, such as corn oil soils, was compared to a multipurpose alkaline composition with 1% active aminocarboxylate chelant (see multipurpose alkaline composition in Table 2) to assess additional performance benefits. Initial assessment of the multipurpose alkaline composition was completed on soiled coupons with polymerized corn oil. Additional testing was completed on tea stains, to determine if the multipurpose alkaline composition containing the chelant could expand performance benefits beyond greasy soil removals.

Preparation of polymerized Corn Oil Panels. Corn oil soils were prepared onto 3×5-inch stainless steel (304 grade) panels by lightly coating corn oil using a 2-inch polyurethane brush. The panels are rectangular flat sheets of stainless steel to simulate the surface of vertical surfaces surrounding grilling equipment where vaporized grease collects and coats. Protecting coating is removed from the coupons before they are cleaned, rinsed and any residue removed before the coupons are dried. The panels were coated with the polymerized corn oil. They were coated evenly to ensure no streaks of bare steel remained and any excess oil was removed using only the weight of the brush. Approximately 0.12 g+/−0.01 g corn oil was applied to the coupon.

Panels were then placed on an aluminum tray and cooked in a preheated 375° F. oven for approximately 20 minutes (rotating the tray at 10, 15 and 20 minutes) until the polymerized oil was no longer tacky and exhibited a light amber color. After approximately 10 minutes of cooking the oil begins to polymerize and thicken and smoke evolves from the oil. The tray is rotated to ensure panels were evenly heated in oven. The coupons were then allowed to cool overnight at ambient temperature and placed on a rack with the coated side angled down to reduce any dust accumulation. The coupons are cured after resting for 24 hours at room temperature before testing with the Control and Multipurpose alkaline composition.

Figure 1B:
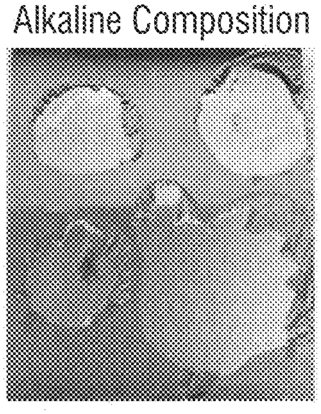

A first test comparing the Control to the Multipurpose alkaline composition dropped the chemistries onto panels using a pipet and measured the time in seconds for the cleaning composition to penetrate the polymerized corn oil soil on the coupons. The Control efficacy is shown on FIG. 1A and the Multipurpose alkaline composition efficacy is shown on FIG. 1B. Importantly the measured time to penetrate and remove the corn oil is shown in Table 3.

TABLE 3

| | Time (seconds) |
|---|---|
| Control | 40-75 |
| Multipurpose alkaline composition | 30-90 |

The range in time (sec.) measured in Table 3 is due to soil variability on the coupons as a result of variations in soil polymerization. However, the Multipurpose alkaline composition's ability to begin more quickly removing the polymerized corn oil shows an improved cleaning performance over the Control.

Figure 2A:
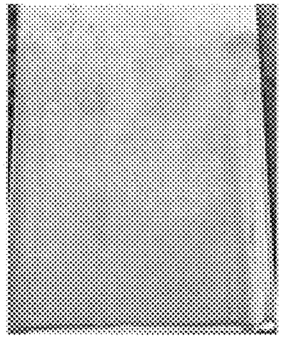
FIGS. 2A-2B show photographs of a soak test using a Control formulation (FIG. 2A) compared to a multipurpose alkaline composition (FIG. 2B) on stainless steel coupons for efficacy in time to completely remove corn oil soil on the coupons as described in Example 1.
Figure 2B:
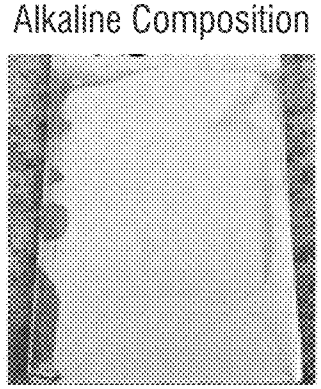

A second test compared the Control to the Multipurpose alkaline composition for a soaking application of the chemistries onto soiled coupons with a tea stain. The coupons were submerged into a test solution of the chemistry being evaluated and the amount of time required for complete soil removal was measured. The Control efficacy after a 60 second soak time is shown in FIG. 2A and the Multipurpose alkaline composition efficacy is shown in FIG. 2B. As depicted in the photographs, the Multipurpose alkaline composition containing the chelant shows a visually improved removal of the tea stains.

Overall, the results showed that at even a 1% active level chelant in the Multipurpose alkaline composition provided a quicker penetration and removal of the corn oil soil with the drop test (FIG. 1B) as well as enhanced cleaning performance in stain removal in the soak test (FIG. 2B).

Example 2

Figure 3:
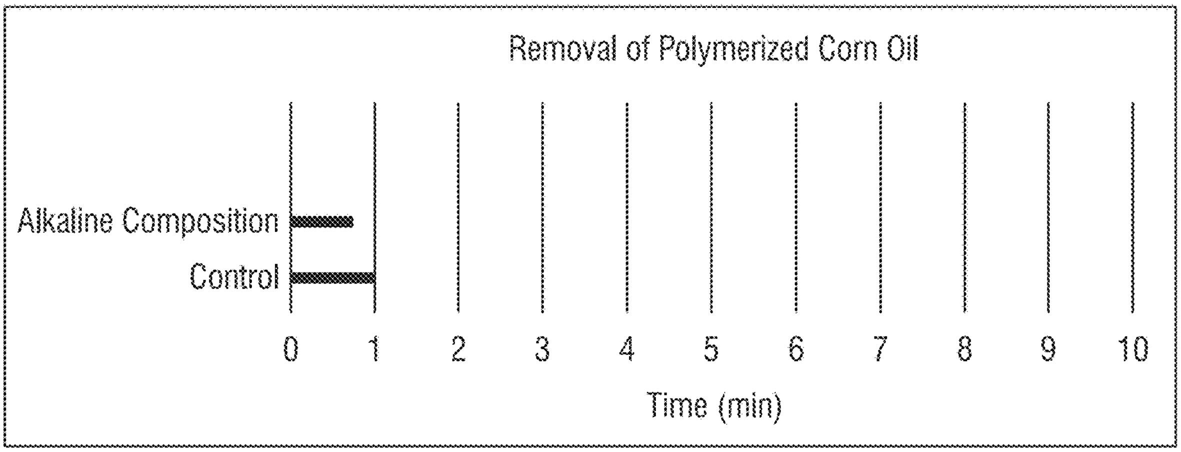
FIG. 3 shows a graph of the speed of removal of polymerized corn oil soils from coupons as described in Example 2.

Additional testing of the Multipurpose alkaline composition compared to Control was conducted compare how quickly the compositions can remove polymerized corn oil from coupons. The methodology of Example 1 for the polymerized corn oil soils was used with the chemistry dropped onto the coupons. The coupons were contacted with the compositions to assess for speed of removal. The efficacy of the compositions is shown in FIG. 3, consistent with Example 1, that the Multipurpose alkaline composition containing a chelant provides additional benefit in the speed of penetration and removal of the polymerized corn oil soils from the coupons compared to Control.

Example 3

Methods for assessing tea-stained tile cleaning performance were performed using the Multipurpose alkaline compositions compared to Control (as outlined in Example 1). The testing of the Multipurpose alkaline compositions against tea stains demonstrates ability to treat and remove one of the hardest stains in the warewash process. The composition of tea is complex with oxidized polyphenols (tannins) bridged by calcium silicates in its structure of the stain on a surface. The evaluated method is used to create the stain on white ceramic tiles and then try to remove it by using a standard automated dish machine with a known concentration of detergent. Performance is evaluated by comparison between sets of tiles using both visual and image manipulation methods.

Initially, tiles were washed in standard dish machine with a highly alkaline detergent containing a high concentration of chelants. Cycles on the dish machine are run until the tiles are fully clean. Tiles are then ready to be soiled.

To prepare tiles for testing, a tea bath was filled with 17 grain hard water and heated to 180° F. using a steam line. 150 Lipton black tea bags were added and agitated for about 5 minutes. The tea bags were removed while squeezing the liquid out of them into the broth. The temperature in the bath was then decreased to about 155-160° F. Then the airline leading to the tea bath was turned on. A set of tiles was added to a rack in a dipper so that the tiles were dipped 25 times for a period of 1 minute each time in the solution and 1 minute out of solution for each dip. If necessary, deionized water was added to the dipper to replace any water loss by evaporation. The tiles were then allowed to air dry for 3 days (or baked in an oven at 180° F. for 2 hours before testing).

To assess the ability of Multipurpose alkaline compositions to better remove soil, stained tiles were submerged into beakers of various cleaning compositions. Before the tiles were washed, the amount of soil on the tiles was noted by taking pre-cleaned pictures and visual assessments of the tiles. Beakers of test solutions were prepared using the RTU formulations. The solutions were stirred at 100 rpm. The tea-stained tiles were dipped into the respective beaker for 30 seconds, 1 minute, and 2 minutes. Thereafter the tile was visually analyzed and then quantified using imaging software to assess the cleanliness of the tile.

Figure 4:
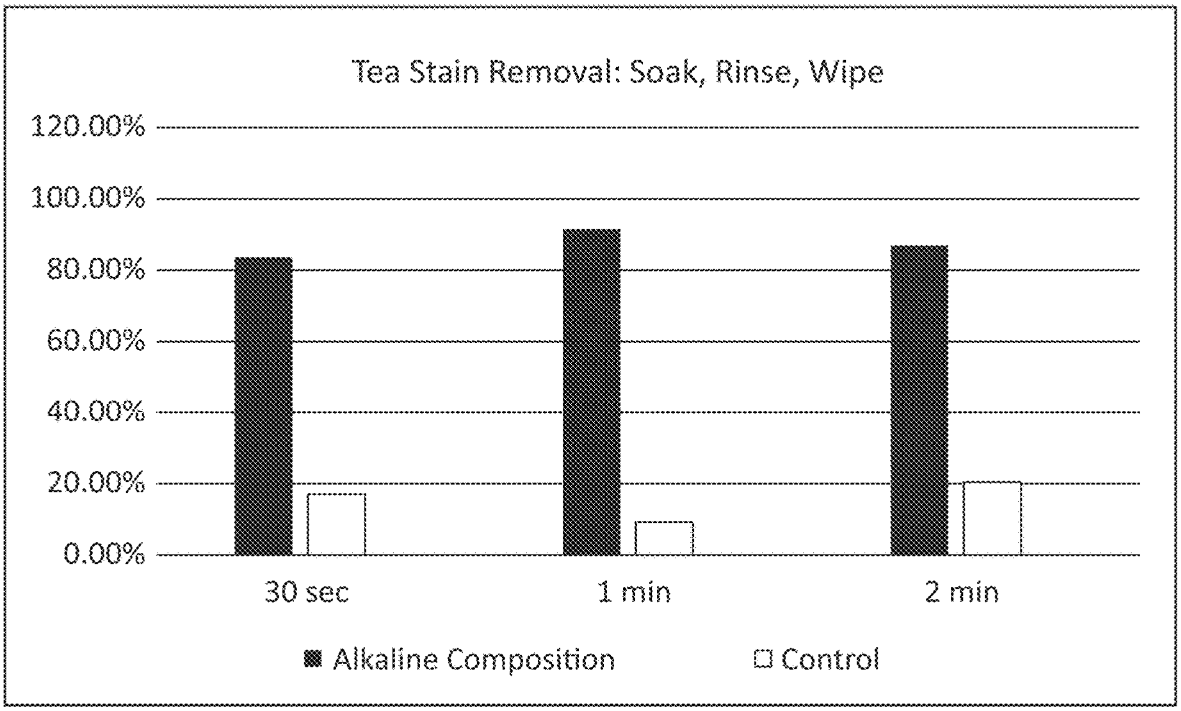
FIG. 4 shows a graph of tea stain removal efficacy of a Control formulation compared to a multipurpose alkaline composition following a 30 second, 1 minute and 2-minute soak as described in Example 3.

The Control versus Multipurpose alkaline composition efficacy results are shown on FIG. 4 along with the % removal measurements shown in Table 4 and again summarized in Table 5.

TABLE 4

| Treatment | Soak time | initial | final | % removal |
|---|---|---|---|---|
| Multipurpose alkaline composition | 30 sec | 74.9 | 89.2 | 83.63% |

TABLE 4-continued

| Treatment | Soak time | initial | final | % removal |
|---|---|---|---|---|
| Control | 30 sec | 75 | 77.9 | 17.06% |
| Multipurpose alkaline composition | 1 min | 73 | 90.4 | 91.58% |
| Control | 1 min | 74.7 | 76.3 | 9.25% |
| Multipurpose alkaline composition | 2 min | 72.9 | 89.5 | 86.91% |
| Control | 2 min | 75.9 | 79.2 | 20.50% |

TABLE 5

| Treatment | 30 sec | 1 min | 2 min |
|---|---|---|---|
| Multipurpose alkaline composition | 83.63% | 91.58% | 86.91% |
| Control | 17.06% | 9.25% | 20.50% |

The test results show that the Multipurpose alkaline composition containing a chelant performs substantially better than the Control.

Example 4

Mechanical degreasing efficacy of the Multipurpose alkaline composition compared to Control (as outlined in Example 1) and a negative control (DI water) was assessed using red and black soils. The preparation of and testing for each of red and black soils is described.

Black Soil Preparation. A black soil including about 50 grams mineral spirits, about 5 grams mineral oil, about 5 grams motor oil, about 2.5 grams black pigment dispersion and about 37.5 grams bandy black clay was prepared. A plurality of 3"×3" white vinyl tiles were soiled on the back, grooved side with approximately 0.75 grams of the black test soil using a 3" foam brush. The tiles were allowed to dry at room temperature overnight. The next day, the tiles were placed into a soaking tray containing about 200 grams of the cleaning compositions for about 2 minutes. Tiles were then subjected to abrasion cleaning using a sponge and Gardner apparatus for a total of 10 passes in each direction.

Red Soil Preparation. A red soil consisting of lard, oil, protein, and iron (III) oxide (for color) was prepared. About 30 grams of lard was combined with about 30 grams of corn oil, about 15 grams of whole powdered egg, and about 1.5 grams of $Fe_2O_3$. The back, grooved sides of a plurality of 3"×3" white vinyl tiles were soiled with approximately 0.75 grams of the red soil using a 3" foam brush. The tiles were allowed to dry at room temperature overnight. It is believed that this incubation period allowed the bonds holding the triglycerides and proteins together in the soil to begin to crystallize and interlink. The next day, the tiles were placed into a soaking tray containing about 200 grams of a test composition for about 1 minute. Tiles were then subjected to abrasion cleaning using a sponge and Gardner apparatus for a total of 4 passes in each direction.

The soil removal test was conducted using a Precision Force Applicator (PFA), available from Precision Analytical Instruments, Inc., using a synthetic sponge. The PFA is similar to the Gardner Straightline Apparatus except that it is interfaced with a computer to control various parameters, such as, for example speed, number of repetitions, time between cycles, etc. The synthetic sponge was pre-dampened with water with the excess water squeezed out and then saturated with about 50 grams of the test compositions. The tiles were then placed into the PFA with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360-degree rotation of the tiles. The tiles were then rinsed with city water and dried overnight at room temperature. Hunter Lab L* reflectance of the soiled tiles and washed tiles were measured. The soiled tiles L* reflectance value is represented by the following equation:

$$\text{soiled } L'^* = \frac{1}{3.38\ln\left(\frac{92.1 - 24.74}{\text{soiled } L* - 24.74}\right)}$$

where 3.38, 92.1, and 24.74 are constants. The washed tiles L* reflectance value is represented by the following equation:

$$\text{washed } L'^* = \frac{1}{3.38\ln\left(\frac{92.1 - 24.74}{\text{washed } L* - 24.74}\right)}$$

The percent soil removal was then calculated as:

$$\text{percent soil removal} = \left(\frac{\text{soiled } L'^* - \text{washed } L'^*}{\text{soiled } L'^*}\right) * 100$$

Figure 5:
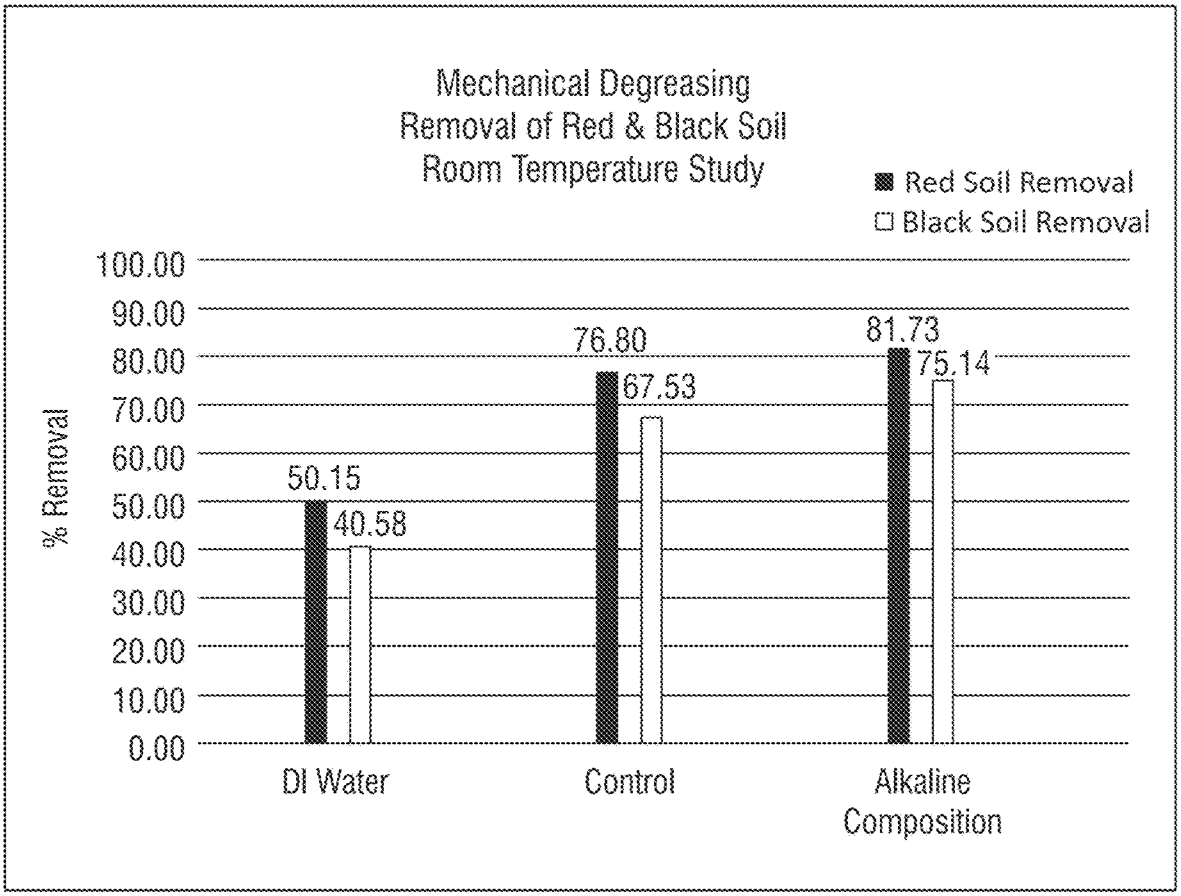
FIG. 5 shows a graph of red and black soil removal by a Control formulation compared to a multipurpose alkaline composition as described in Example 4.

The Control versus Multipurpose alkaline composition efficacy results are shown on FIG. 5 with performance of the Multipurpose alkaline composition surpassing the Control (as well as DI water as a negative control). The addition of the chelant to the formulation beneficially enhanced red and black soil removal.

Example 5

Spot treatment efficacy of the Multipurpose alkaline composition compared to Control (as outlined in Example 1) and a negative control (5 gpg water) was assessed.

Tea-stained tiles were prepared according to the procedure described in Example 3. The tiles were sprayed with the test compositions and the compositions were allowed to dwell on each tile for one minute. Then the tiles were washed in a Hobart AM-15 dishwashing machine in a single cycle with 10 drops of a commercially available warewashing detergent (60-100 wt-% sodium hydroxide, alkaline “Control”) using a 5 gpg water, and a regular, non-foaming trigger spray.

Figures 6A, 6B, 6C:
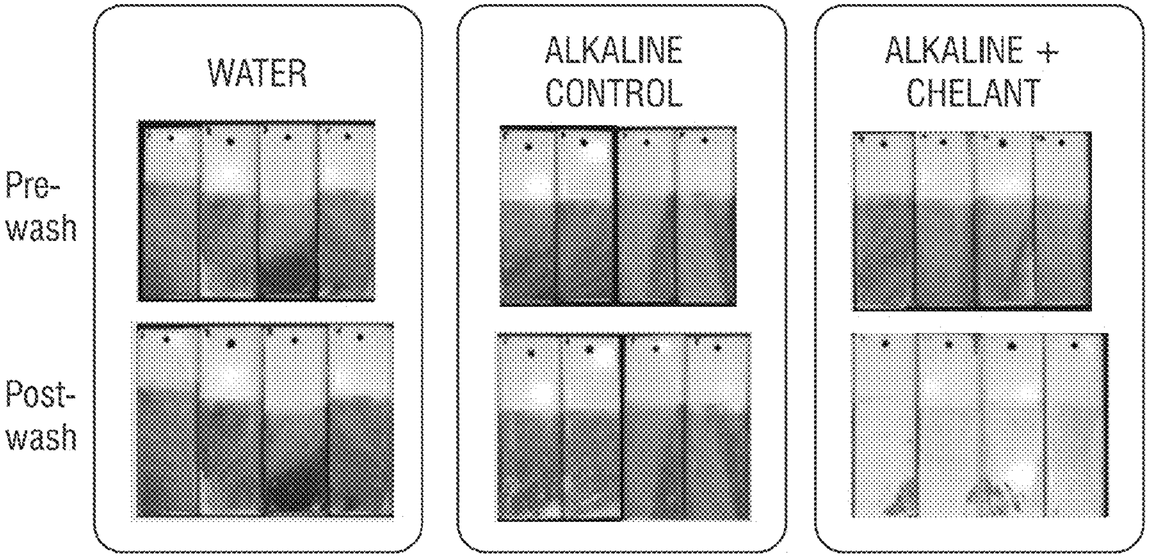
FIGS. 6A-6C show photographs of stain removal using spot treatments containing water (FIG. 6A), alkaline control composition (FIG. 6B), and the multipurpose alkaline composition (FIG. 6C) as described in Example 5.
Figures 7A, 7B, 7C:
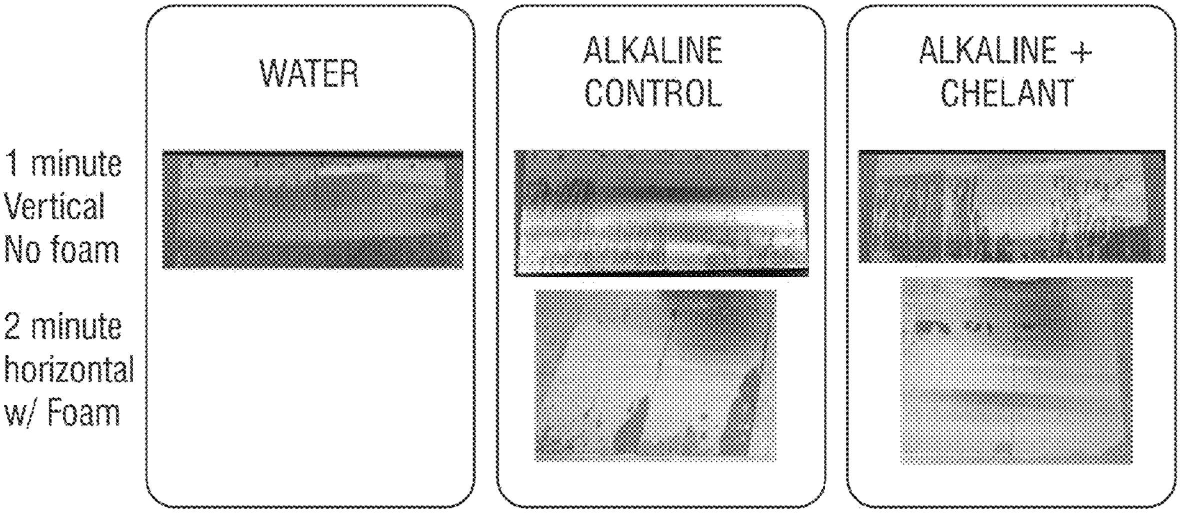
FIGS. 7A-7C show photographs of polymerized corn oil removal using spot treatments containing water (FIG. 7A), an alkaline control composition (FIG. 7B), and the multipurpose alkaline composition (FIG. 7C) as described in Example 5.
Figure 8A:
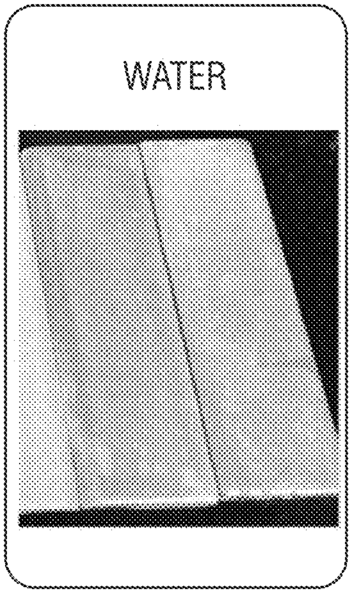
FIGS. 8A-8C show photographs of protein removal using spot treatments containing water (FIG. 8A), an alkaline control composition (FIG. 8B), and the multipurpose alkaline composition (FIG. 8C) as described in Example 5.
Figure 8B:
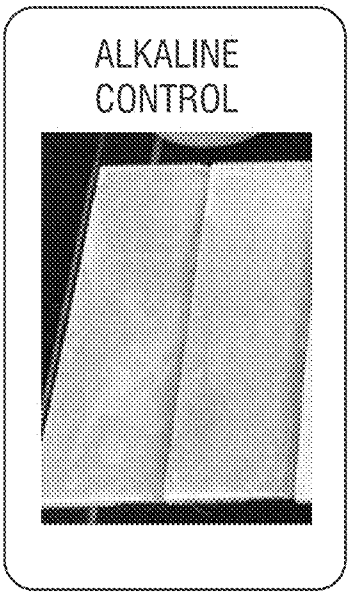
Figure 8C:
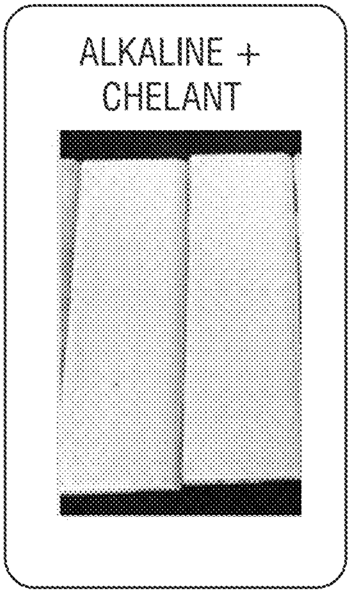
Figure 9:
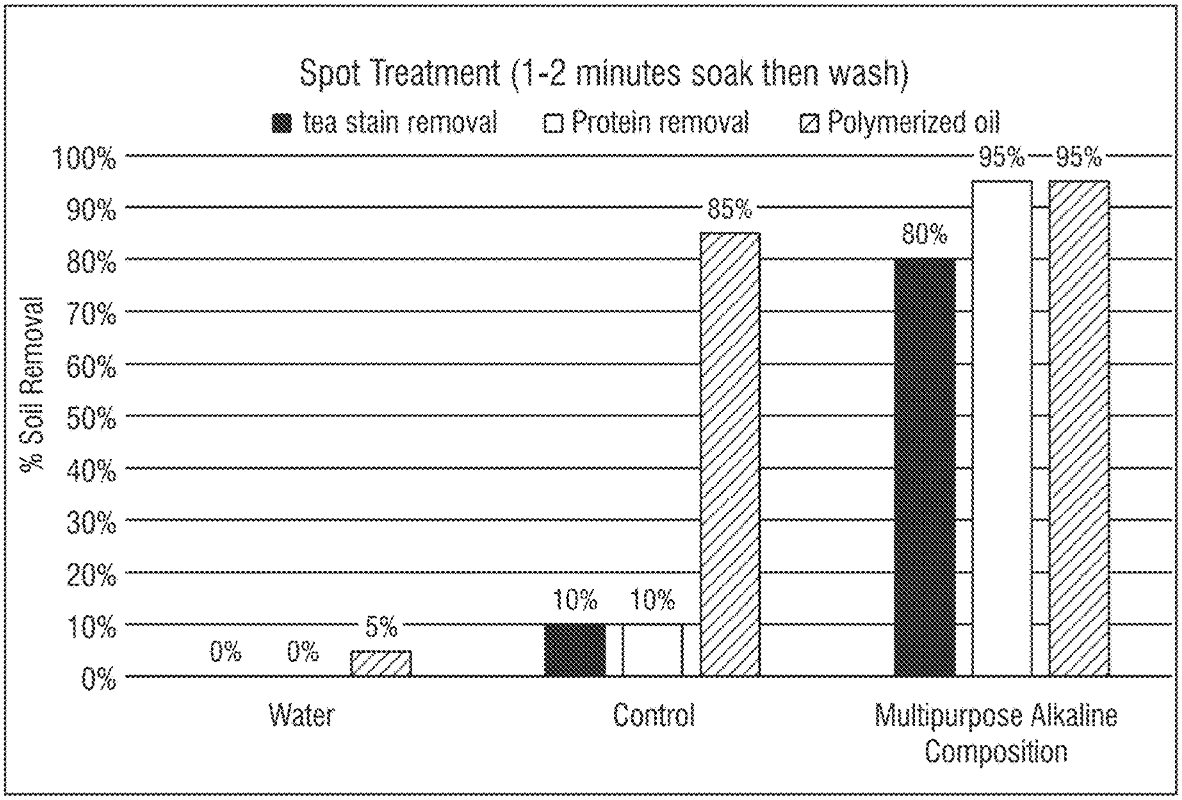
FIG. 9 shows a graph of tea stain removal, protein removal, and polymerized corn oil removal by spot treatment of the alkaline control composition compared to a multipurpose alkaline composition as described in Example 5.
Figure 10A:
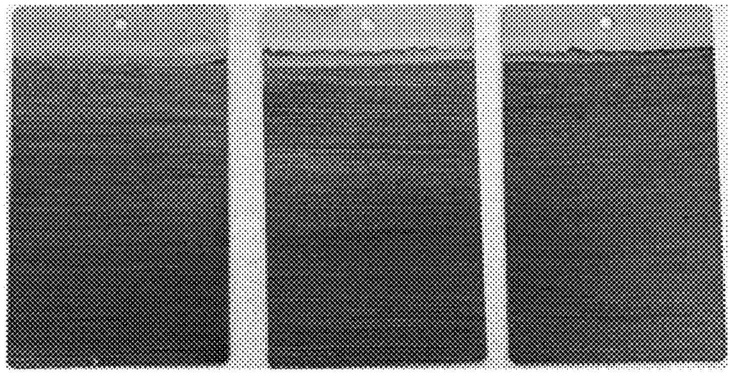
FIGS. 10A-10F show photographs of complex soil removal by an alkaline control composition and a multipurpose alkaline composition following a 2-minute (FIG. 10A control, FIG. 10D multipurpose alkaline composition), 5-minute (FIG. 10B control, FIG. 10E multipurpose alkaline composition), and 10-minute (FIG. 10C control, FIG. 10F multipurpose alkaline composition) soak as described in Example 6.
Figure 10B:
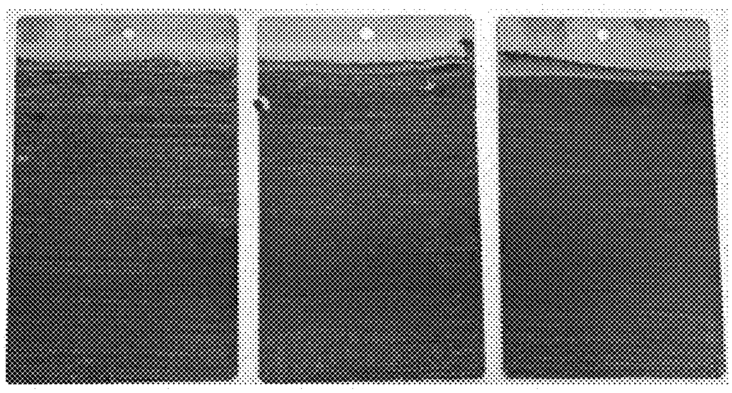
Figure 10C:
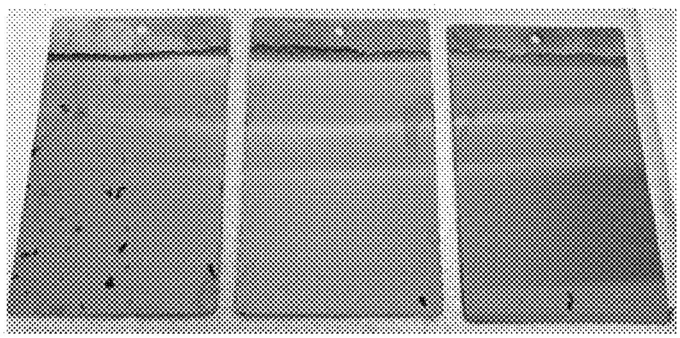
Figure 10D:
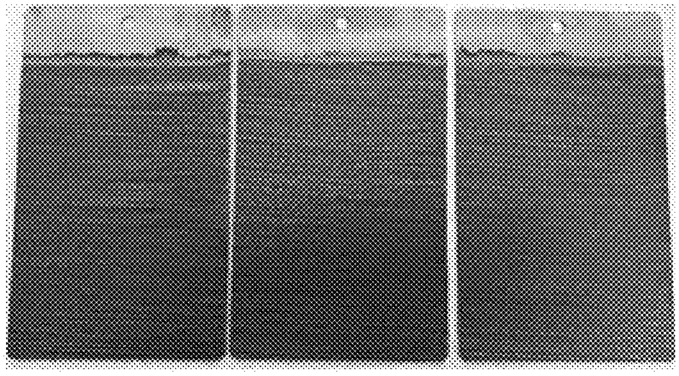
Figure 10E:
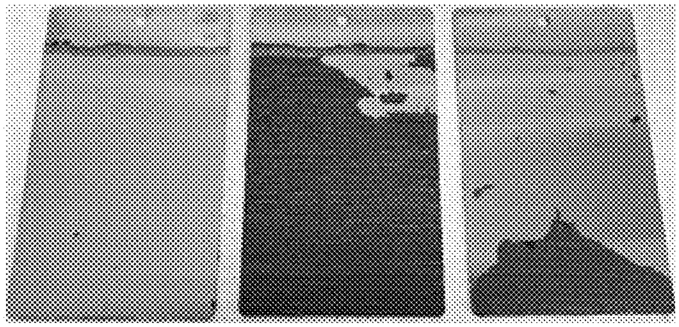
Figure 10F:
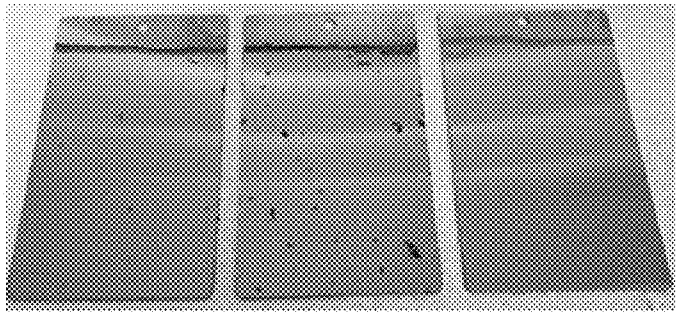

Photographs were taken of each tile before and after the wash and shown in FIGS. 6A-6C. The percent of stain removal was calculated as well, and the Control versus Multipurpose alkaline composition efficacy results are shown in FIG. 9. The Multipurpose alkaline cleaning composition outperformed both the alkaline control composition and water. The multipurpose alkaline cleaning composition removed significantly more of the soil than either control composition, as shown in FIGS. 8A-8C.

Similar testing was done to compare spot treatment for corn oil soil removal. Panels soiled with corn oil were prepared as outlined in Example 1. The panels were sprayed with the test compositions (Alkaline+Chelant) and the compositions were allowed to dwell on each panel for one to two minutes. Panels were either sprayed with a non-foaming sprayer with 1 minute of dwell time wherein the panels were oriented vertically, or the panels were sprayed with a foaming trigger sprayer and oriented horizontally. The panels were then washed in a Hobart AM-15 dishwashing machine in a single cycle with 10 drops of Alkaline Control and 5 gpg water. Photographs of the panels were taken after the cleaning was complete, and percent soil removal was calculated. The Multipurpose alkaline cleaning composition removed more of the polymerized corn oil than either the control or water, as shown in FIGS. 7A-7C and FIG. 9.

Similar testing was done to compare spot treatment for protein removal. Soil preparation. The panels were sprayed with the test compositions and the compositions were allowed to dwell on each panel for one minute. The panels were then washed in a Hobart AM-15 dishwashing machine for 10 cycles using 10 drops of Alkaline Control and 5 gpg water. Photographs were taken of the panels after cleaning in the dishwashing machine and the amount of protein removed was calculated. The multipurpose alkaline cleaning composition again outperformed the Control formulations as shown in FIGS. 8A-8C and in FIG. 9.

Example 6

The efficacy of the Multipurpose alkaline composition compared to Control (as outlined in Example 1) for removing complex soils was assessed using a baked food soil. The preparation and testing for the baked food soil are described.

A mixture of 2:2:1 lard:corn oil:whole egg powder was prepared by first melting the lard and then adding the corn oil and egg powder at 40° C. The soil was maintained at 40° C. for consistency during application to the coupons. Stainless steel 3-inch by 5-inch coupons were weighed and then approximately 0.27 to 0.29 grams of soil was applied to each coupon in an even layer using a foam brush. The soiled coupons were baked at 450° F. for 60 minutes, wherein the trays holding the coupons were rotated halfway through the baking procedure. The coupons were then allowed to cool and then weighed to determine the final soil mass. Each coupon was then soaked flat in 80 mL of the test composition for the designated amount of time (2 minutes, 5 minutes, 10 minutes) and then removed and rinsed with DI water. Photographs were taken of each coupon and total removal of soil was determined by weight.

Figure 11:
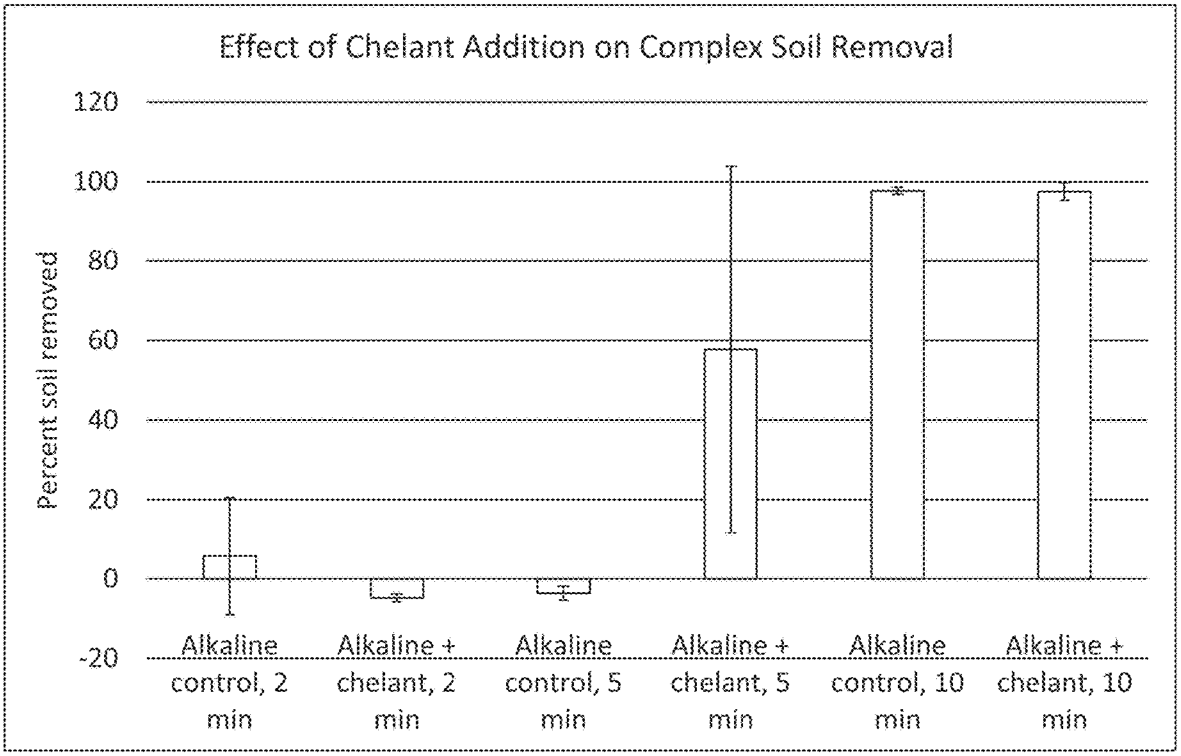
FIG. 11 shows a graph of complex soil removal efficacy of an alkaline control composition compared to a multipurpose alkaline composition following a 2-minute, 5 minutes, and 10-minute soak as described in Example 6.

The multipurpose composition demonstrates increase speed in complex soil removal as demonstrated in FIGS. 10A-10F and FIG. 11. After a 2-minute soak, the control and the multipurpose alkaline composition both show little baked food soil removal as demonstrated in FIG. 11 and the photographs in FIGS. 10A and 10D. Likewise, both compositions demonstrate significant baked food soil removal after 10 minutes as shown in FIG. 11 and the photographs in FIGS. 10C and 10F. However, in the intermediary, after 5 minutes, the control formulation shows no baked food soil removal whereas the multipurpose alkaline composition has significant soil removal as shown in FIG. 11 and the photographs of FIGS. 10B and 10E. The multipurpose alkaline composition exhibits accelerated complex soil removal compared to control.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A composition comprising:
from 7 wt-% to about 50 wt-% non-hydroxide alkalinity source that is monoethanolamine, diethanolamine, triethanolamine or a combination thereof;
from about 1 wt-% to about 50 wt-% anionic surfactant;
from about 1 wt-% to about 75 wt-% solvent or solvent system consisting of aromatic alcohol(s), alkanol amine(s), ether amine(s), glycol ether(s), ester(s), or combinations thereof, wherein said solvent or solvent system is the sole solvent or solvent system present in the composition other than water;
from about 0.5 wt-% to about 25 wt-% chelant; and water,
wherein a use solution of the composition has a pH of from about 10 to about 11.5;
wherein the composition does not comprise a nonionic surfactant, does not comprise an amphoteric surfactant, and does not comprise a zwitterionic surfactant; and
wherein the composition provides substantially similar or superior cleaning efficacy compared to hydroxide-based and corrosive, highly alkaline compositions.

2. The composition of claim 1, wherein the solvent is benzyl alcohol and wherein the chelant is methylglycine-N—N-diacetic acid trisodium salt (MGDA).

3. The composition of claim 1, wherein the chelant is a phosphonic acid or phosphonate, gluconic acid or gluconate, phosphate, aminocarboxylate or a derivative, pyrophosphate, ethylenediamine or ethylenetriamine derivative, hydroxyacid, mono-, di-, or tri-carboxylate or their corresponding acid, or combinations thereof.

4. The composition of claim 1, wherein the anionic surfactant is an alkylbenzene sulfonate.

5. The composition of claim 1, wherein the composition is hydroxide-free.

6. The composition of claim 1, wherein the chelant is methylglycine-N—N-diacetic acid trisodium salt (MGDA) and the composition provides at least about 80% to about 100% soil removal of protein soils, grease soils, stains, or lime scale from a treated surface.

7. The composition of claim 6, wherein the soil removal is efficacious as a multipurpose pretreatment, spot treatment, or soil removal in a warewash application.

8. A method of cleaning, pretreating and/or degreasing comprising:
applying the alkaline composition according to claim 1 to a surface or object in need of cleaning, pretreatment, and/or degreasing; and
removing soils, stains, and/or hard water deposits from the surface or object.

9. The method of 8, wherein the composition penetrates soils more quickly a than an alkaline control composition that does not comprise the chelant, or a hydroxide-based and corrosive, highly alkaline composition.

10. The method of claim 8, wherein the step of applying the alkaline composition to the surface or object is a multipurpose spot treatment, wherein the spot treatment removes grease soils and stains by at least about 80%.

11. The method of claim 8, wherein the soils comprise a polymerized soil, carbonized soil, baked on soil, and/or other fat soils.

12. The method of claim 8, wherein the application of the composition does not require use of personal protective equipment (PPE).

13. The method of claim 8, wherein the composition is applied to the soiled surface or object for an amount of time from about one second to about 1 hour depending on the level of polymerization of the soil.

14. The method of claim 8, further comprising a first step of formulating a use solution of the composition, wherein the alkaline composition is diluted at a dilution factor between about 1 to about 22 ounces per gallon of diluent, and wherein the use solution has a pH less than about 11.5.

15. The method of claim 8, wherein the step of applying the alkaline composition to the surface or object is a pre-treatment step before a subsequent cleaning step with a detergent composition.

16. The method of claim 15, wherein the alkaline composition is applied before the object is placed into a ware washing machine or a sink.

17. The method of claim 8, wherein the soil is on a food processing equipment, an environmental surface, equipment used during food preparation, or on a textile or laundry substrate surface.

18. The method of claim 8, wherein the surface is a floor, and wherein the floor is an interior or exterior surface.

* * * * *